Oct. 19, 1954   B. C. MAIER   2,692,150
TRACTOR HITCH ATTACHMENT FOR CONNECTION FACILITATING
Filed May 7, 1951
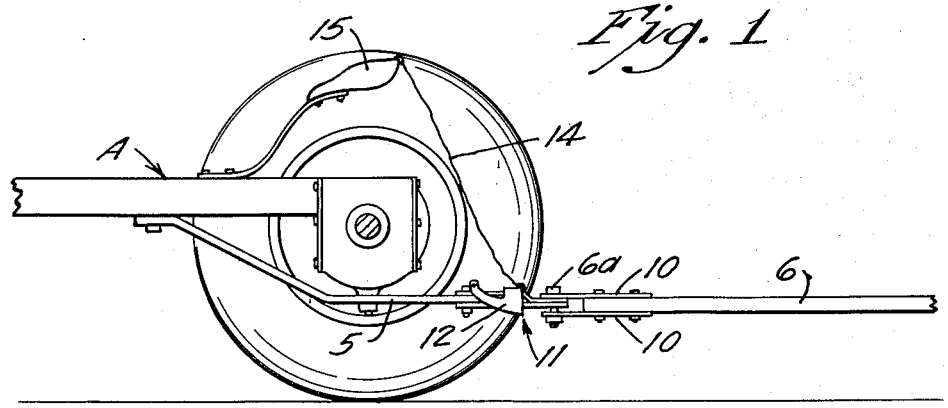
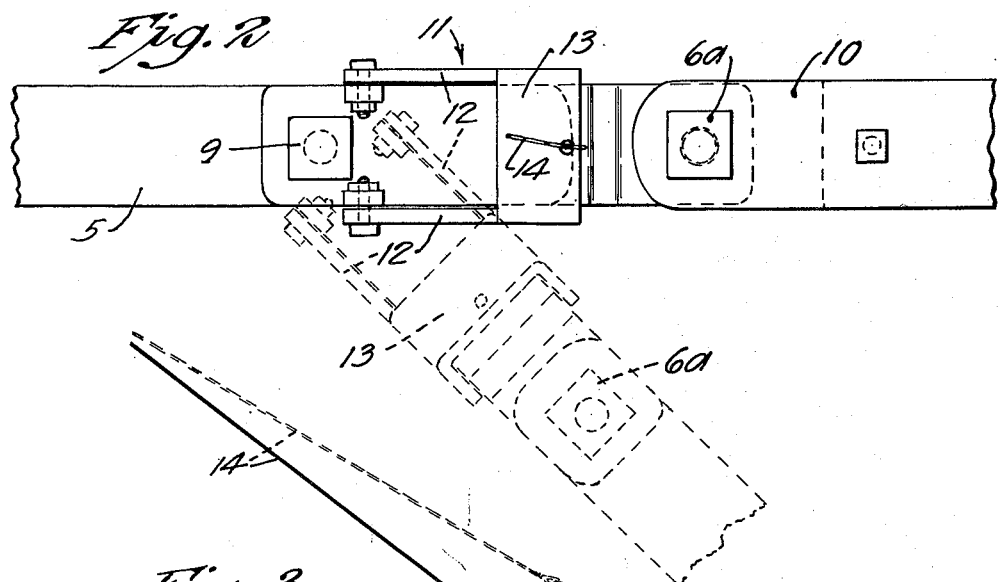
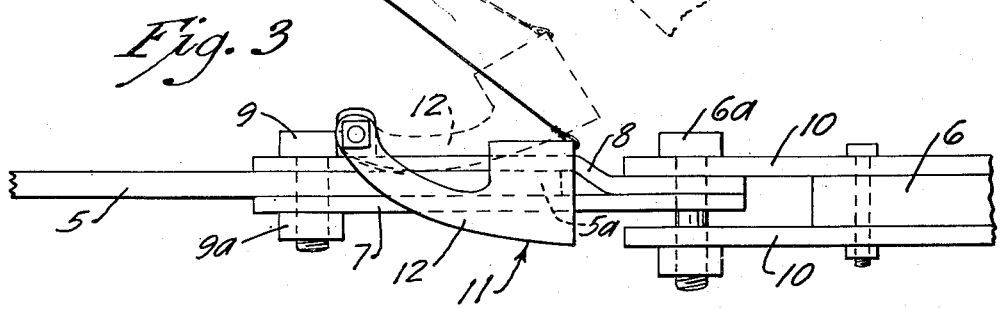
INVENTOR.
Bernard C. Maier
BY
Williamson & Williamson
ATTORNEYS Patented Oct. 19, 1954

2,692,150

UNITED STATES PATENT OFFICE 2,692,150

TRACTOR HITCH ATTACHMENT FOR CONNECTION FACILITATING

Bernard C. Maier, Canby, Minn.

Application May 7, 1951, Serial No. 224,896

2 Claims. (Cl. 280—478)

This invention relates generally to tractor hitches and particularly to a tractor hitch adapted to permit extremely easy connection and disconnection between the tractor draw-bar and the tongue of a trailing unit.

It is an object of my invention to provide an attachment adapted to be interposed between the towing member of a tractor and the towing member of a trailing unit to facilitate interconnection of said tongue and drawbar.

It is another object to provide a tractor hitch mechanism adapted to be pivotally connected to the draw-bar of a tractor to pivotally interconnect said draw-bar with the tongue of a trailing unit with provision for holding said draw-bar pivotal joint against swinging movement.

It is still another object to provide a tractor hitch mechanism adapted to provide a double pivot for facilitating connection of the tongue of a trailing unit to the draw-bar of a tractor with means for locking one of said pivots against swinging movement to permit more accurate steering control of the trailing unit.

More specifically, it is an object to provide a tractor hitching mechanism pivotally connected in forwardly spaced relation from the rear end extremity of a tractor draw-bar and extending rearwardly therebeyond, and having a locking element adapted to be held in releasing position as long as the interconnection element of the hitching mechanism is not aligned with the tractor draw-bar but adapted to shift into locking position immediately when the interconnection element is swung into alignment with the draw-bar of the tractor.

Still more specifically, it is an object to provide a tractor hitch having a slightly elongated interconnection element having its forward end pivotally connected in forwardly spaced relation to the rear end of the draw-bar of a tractor, and extending rearwardly beyond said tractor to be pivotally connected to the tongue of a trailing unit to provide a double pivotal joint between said tongue and said draw-bar, said hitch having a latch element consisting in a channel member with the flanges thereof extending in depending relation to normally hold said interconnection element in alignment with the tractor draw-bar and prevent swinging movement of said element on its forward pivot, said latching member being swingable on a horizontal axis into upwardly retracted position to permit swinging movement of said interconnection element on said forward pivot.

These and other objects and advantages will more fully appear from the following description made in connection with the accompanying drawings wherein like reference characters refer to the same or similar parts throughout the several views, and in which:

Fig. 1 is a longitudinal sectional view through the left side portion of the rear axle of a tractor and showing my improved tractor hitch in operative position in side elevation.

Fig. 2 is a top plan view of my hitching mechanism showing the same in drawing position by full lines and in interconnection or turning position by dotted lines; and Fig. 3 is a side elevational view of the structure shown in Fig. 2 showing the latching mechanism in raised position by dotted lines.

As illustrated in the accompanying drawings, I show a conventional tractor designated as an entirety by the letter A and having a conventional towing member such as the rigid draw-bar 5. A conventional towing member such as the tongue element 6 of a wagon or other trailing unit is also shown in the accompanying drawings.

My improved hitching mechanism comprises an elongated interconnection member made in the form shown from a pair of co-extensive metal straps 7 and 8 respectively. The strap 8 is bent upwardly in slightly spaced relation to the rear end thereof and extends forwardly from said bent up portion in upwardly spaced relation to the lower strap 7 to permit the rear portion 5a of the draw-bar to be interposed between said two strap elements, as best shown in Figs. 1 and 3. A pair of vertically aligned apertures are formed in the rear portions of the two straps 7 and 8 and an aperture is formed in the rear portion of the draw-bar 5 in forwardly spaced relation to the rear extremity of said draw-bar. A pin such as the threaded bolt 9, extends through all three of said apertures to pivotally interconnect the interconnection member formed by the two straps 7 and 8 with the rear portion of the draw-bar 5, and a nut 9a securely holds the pin 9 in interconnecting position. The two strap elements 7 and 8 are disposed in adjacent side by side relation at their rear portions and are adapted to be interposed between the two interconnection straps 10 of the tongue element 6 and are apertured to permit a hitching pin 6a to be extended therethrough to pivotally connect the rear portion of said interconnection member with the forward portion of the tongue 6, thus providing an interconnection between the draw-bar 5 and the tongue 6, which permits swinging movement on a pair of spaced vertically disposed pivotal axes or in other words, provides a double pivotal interconnection which permits extremely easy positioning of said interconnection member to facilitate alignment of the rear apertures thereof with the forward apertures of the tongue element 6 to permit the hitching pin 6a to be inserted into hitching position.

Obviously, this double pivotal interconnection between the tongue 6 and the draw-bar 5 would not produce a good draft or towing connection between the trailing unit and the draw-bar, and would tend to induce weaving in the trailing unit. Therefore, I have provided a latch mechanism designated as an entirety by the numeral 11 and having a pair of horizontally pivoted spaced side arms or flanges 12.

Both the rear portion of the draw-bar 5 and the straps 7 and 8 of the interconnection member are of substantially the same width and the space between the arms or flanges 12 is just slightly greater than this width to permit said arms to swing upwardly and downwardly along the lapped side edge portions of said straps 7 and 8 and the rear portion 5a of the tongue. A top web or stop element 13, in the form shown, interconnects the rear portions of said arms or flanges 12, and combines therewith to form a pivoted locking channel. The flanges 12 are beveled along the bottom edges and in the form shown, this bevel consists in a downwardly convex, curved arc. A flexible operating line 14 is connected with the rear portion of the web 13 and extends forwardly and upwardly therefrom to a convenient point, such as the tractor seat 15 shown in Fig. 1.

The following is a description of the operation of my improved tractor hitch.

The tractor A is initially backed up to locate the rear portion 5a of the draw-bar 5 in close proximity to the forward portion of the tongue 6 and the latching mechanism is raised to permit the interconnection member to be swung about the front pivot pin 9 and thereby facilitate alignment of the rear aperture with the apertures of the tongue 6 to permit the hitching pin 6a to be dropped into hitching position. Since the wagon or trailing unit is often heavily loaded at the time the tractor is to be attached thereto, and since the draw-bar is rigidly connected to the tractor, it is often extremely difficult to obtain the alignment of the apertures for the hitching pin 6a. However, by providing the double pivotal interconnection joint between the draw-bar and the tongue element, it is an extremely easy matter to swing the interconnection member back and forth to obtain the proper alignment of the hitching apertures. Also, the relatively short arc of swinging permits extremely accurate and quick adjustment both laterally of the draw-bar and to some extent, longitudinally thereof. When it is desired to make an extremely sharp turn, as when plowing, the double pivotal connection permits a sharper turn than only a single pivotal connection and therefore it is desirable to provide the latch releasing control line 14 to raise the latch member 11 and permit swinging movement on the pin 9 as well as on the pin 6a. The beveled or concavely curved lower edge of the arms or locking flanges 12 provides a relatively smooth engagement edge surface, which rides on the top surface of the rear portion 5a of the draw-bar 5 and holds the latch member in raised upwardly retracted position until said rear portion 5a is aligned with the two straps 7 and 8, at which time the engaged flange rides off of the top surface of portion 5a and permits the latch member to drop into locking position.

It will be seen that I have provided a relatively simple, yet highly efficient tractor hitch, which is adapted to permit extremely easy interconnection between the tractor draw-bar and the tongue element of a trailing unit while still permitting a good draft connection between the tractor and the tongue element of the trailing unit. By providing the control line 14, which permits the latch member 11 to be raised, it will be seen that an extremely sharp turn may be made which is desirable under certain circumstances, and after the turn is completed, the latch member will automatically shift downwardly into latching position, as has been previously described.

It will of course be understood that various changes may be made in the form, details, arrangements, and proportions of the parts without departing from the scope of my invention.

What I claim is:

1. A tractor hitch assembly adapted to be interposed between the drawbar of a tractor and the tongue of a trailer unit, said assembly comprising a pair of vertically spaced interconnection members adapted to be pivotally connected at one end to the drawbar element of a tractor and at the other end to the tongue element of a trailer unit to provide a double pivotal joint between said two elements, one of said elements being pivotally connected to said interconnection members and positioned in lapped relation between said two spaced interconnection members with the lapped portion being of substantially the same width as the width of said members, a locking member having a pair of transversely spaced locking flanges with the inner opposed locking surfaces thereof lying in parallel upstanding planes and being horizontally pivoted to the upper interconnection member for swinging movement on an axis disposed transversely thereof, means rigidly interconnecting said flanges in spaced relation above the lower edges thereof to provide an unobstructed space between the lower edge portions of said flanges to permit said flanges to shift downwardly into lapped position along the side edges of the aligned lapped portions of the interconnection members to positively immobilize the pivotal connection between said lapped element and the two interconnection members, and means permitting the locking member to be raised on its transverse horizontal pivotal axis to lift said flanges out of locking engagement and render the pivotal joint operative, the lower edges of said flanges being curved upwardly toward their pivotal connection with the upper interconnection member for engagement with the top surface of the lapped portion of said last mentioned element when the latter and said interconnection members are not in longitudinal alignment to hold said flanges upwardly out of locking engagement until said lapped element is returned to longitudinally aligned position with respect to said interconnection members.

2. A tractor hitch assembly adapted to be interposed between the drawbar of a tractor and the tongue of a trailer unit, said assembly comprising an interconnection structure adapted to be pivotally connected at one end to the drawbar element of a tractor and at the other end to the tongue element of a trailer unit to provide a double pivotal joint between said two units, one of said elements being pivotally connected to said interconnection structure in spaced relation to the end thereof to provide a lapped joint therebetween with the lapped portions being of substantially the same width, a locking member having a pair of transversely spaced longitudinally disposed opposed parallel locking flanges horizontally pivoted to said interconnection structure for swinging movement on a horizontal axis disposed transversely thereof, means maintaining a predetermined spaced relation between said flanges, and said spacing between said flanges being such that the same are adapted to engage the lapped edge portions of said interconnection structure and said last mentioned element to immobilize the pivotal connection therebetween but being controllably shiftable on said pivotal axis to permit mobility of said joint and provide a double pivoted draft connection, said flanges having edge portions extending longitudinally thereof and inclined toward the pivotal connection of the flanges with said interconnection structure for sliding engagement with the lapped portion of said last mentioned element when the latter is not in alignment with said interconnection structure.

References Cited in the file of this patent

UNITED STATES PATENTS

| Number | Name | Date |
|---|---|---|
| 713,393 | Buller | Nov. 11, 1902 |
| 726,759 | Rhoads | Apr. 28, 1903 |
| 2,357,540 | Palmer | Sept. 5, 1944 |
| 2,399,364 | Lewison | Apr. 30, 1946 |